United States Patent
Browder

(10) Patent No.: US 9,244,590 B1
(45) Date of Patent: Jan. 26, 2016

(54) THREE-DIMENSIONAL NAVIGATION USING A TWO-DIMENSIONAL SURFACE

(71) Applicant: Amazon Technologies, Inc., Reno, NV (US)

(72) Inventor: Christopher Elliott Browder, Bellevue, WA (US)

(73) Assignee: Amazon Technologies, Inc., Reno, NV (US)

( * ) Notice: Subject to any disclaimer, the term of this patent is extended or adjusted under 35 U.S.C. 154(b) by 214 days.

(21) Appl. No.: 14/105,872

(22) Filed: Dec. 13, 2013

(51) Int. Cl.
*G06T 19/00* (2011.01)
*G06F 3/0481* (2013.01)
*G06F 3/0488* (2013.01)

(52) U.S. Cl.
CPC .......... *G06F 3/04815* (2013.01); *G06F 3/0488* (2013.01)

(58) Field of Classification Search
CPC ....................................................... G06T 19/00
USPC ......................................................... 715/849
See application file for complete search history.

(56) References Cited

U.S. PATENT DOCUMENTS

| | | | | |
|---|---|---|---|---|
| 7,330,198 | B2 * | 2/2008 | Yamaguchi | G06F 3/04845 345/650 |
| 8,253,761 | B2 * | 8/2012 | Kim | G06F 3/04815 345/650 |
| 8,286,236 | B2 | 10/2012 | Jung et al. | |
| 8,289,316 | B1 * | 10/2012 | Reisman | G06F 3/0425 345/173 |
| 8,334,867 | B1 * | 12/2012 | Davidson | G06F 3/04815 345/419 |
| 8,429,754 | B2 | 4/2013 | Jung et al. | |
| 8,752,166 | B2 | 6/2014 | Jung et al. | |
| 2008/0024484 | A1 * | 1/2008 | Naimark | G06T 7/0028 345/419 |
| 2009/0164379 | A1 | 6/2009 | Jung et al. | |
| 2009/0165127 | A1 | 6/2009 | Jung et al. | |
| 2009/0303231 | A1 * | 12/2009 | Robinet | G06F 3/04815 345/419 |
| 2010/0031351 | A1 | 2/2010 | Jung et al. | |
| 2010/0171712 | A1 * | 7/2010 | Cieplinski | G06F 3/04883 345/173 |
| 2010/0229090 | A1 * | 9/2010 | Newton | G06F 3/0428 715/702 |
| 2011/0041098 | A1 * | 2/2011 | Kajiya | G06F 3/04815 715/849 |
| 2011/0164029 | A1 * | 7/2011 | King | G06F 3/04883 345/419 |
| 2012/0270653 | A1 * | 10/2012 | Kareemi | A63F 13/10 463/33 |
| 2013/0123616 | A1 * | 5/2013 | Merritt | A61B 5/7445 600/427 |
| 2013/0147833 | A1 * | 6/2013 | Aubauer | G06F 3/0416 345/619 |
| 2013/0285920 | A1 * | 10/2013 | Colley | G06F 3/0488 345/173 |
| 2014/0282073 | A1 * | 9/2014 | Curran | G06F 3/0488 715/750 |
| 2014/0294281 | A1 * | 10/2014 | Suzuki | G06K 9/00147 382/133 |
| 2015/0020003 | A1 * | 1/2015 | Karam | H04L 51/04 715/756 |
| 2015/0169119 | A1 * | 6/2015 | Kornmann | G06F 3/0412 345/173 |

* cited by examiner

*Primary Examiner* — Reza Nabi
(74) *Attorney, Agent, or Firm* — Kilpatrick Townsend & Stockton LLP

(57) ABSTRACT

Processes for navigating a three-dimensional (3D) environment using a two-dimensional (2D) input are provided. In some examples, a pair of touch points may be detected, and movement of a third touch point may be used to manipulate a 3D object or navigate a view point in 3D space. Different 2D and 3D input modes may also be provided that allow, for example, similar gestures to perform different commands in different modes. Multiple 3D modes may include a first mode that allows the user to navigate in a 3D environment and a second mode that allows the user to manipulate a 3D object using similar commands.

8 Claims, 13 Drawing Sheets

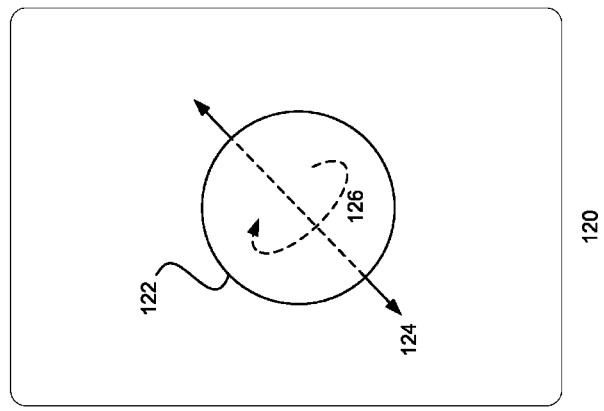
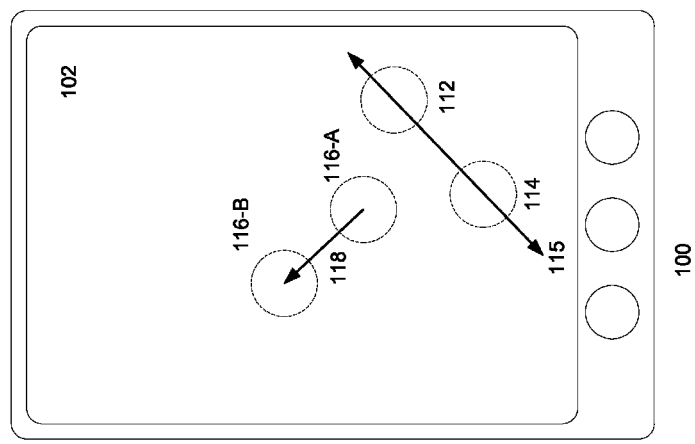
FIG. 1

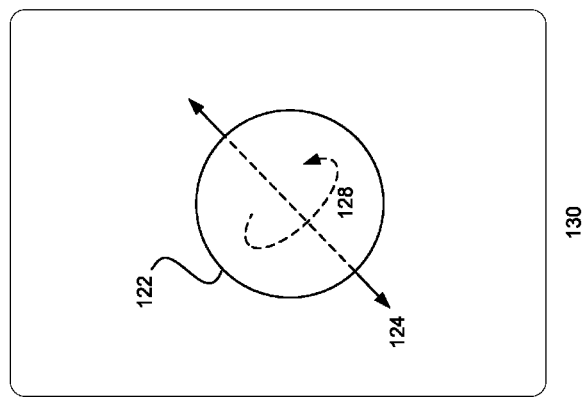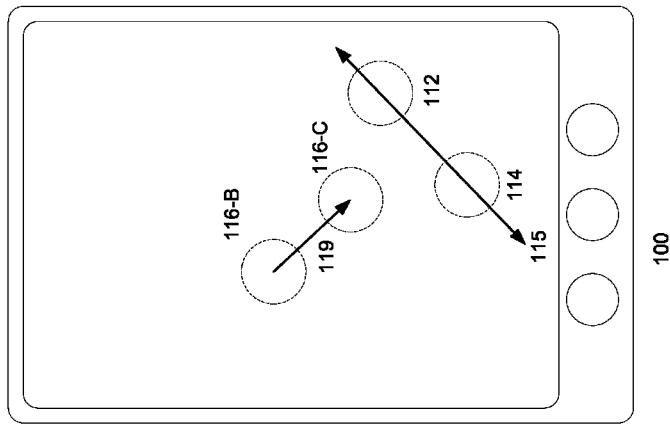
FIG. 2

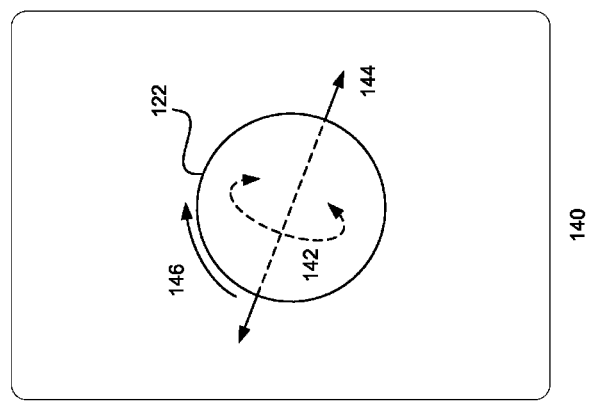
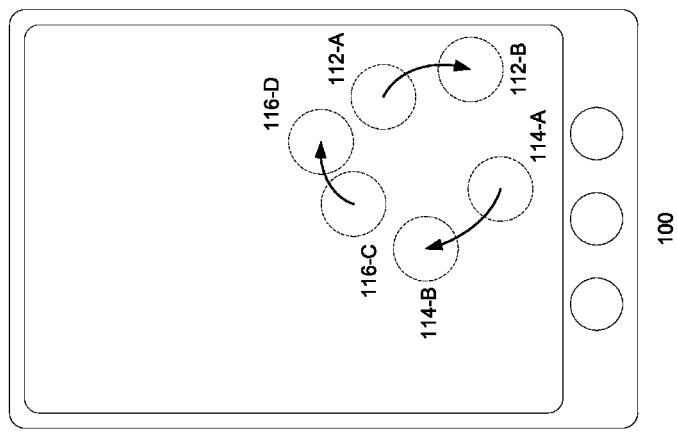
FIG. 3

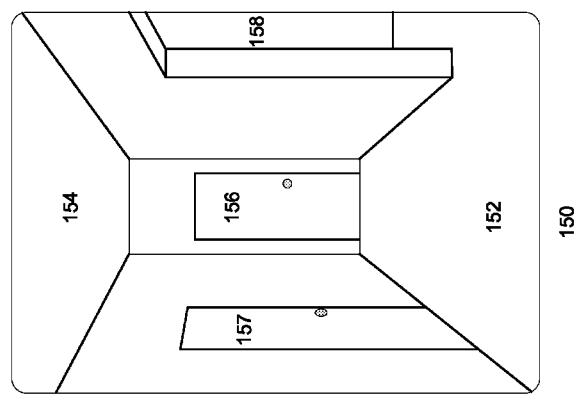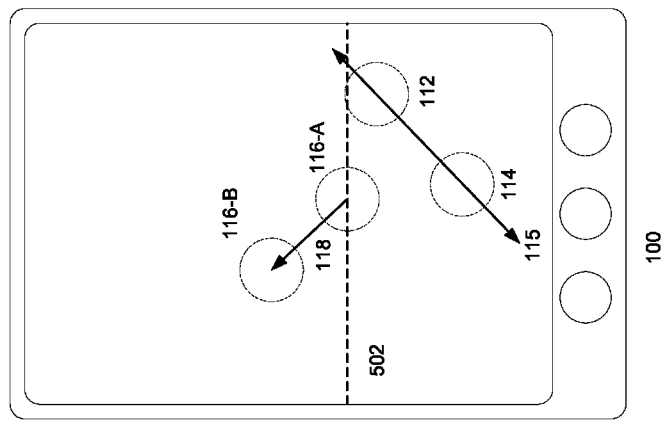
FIG. 5

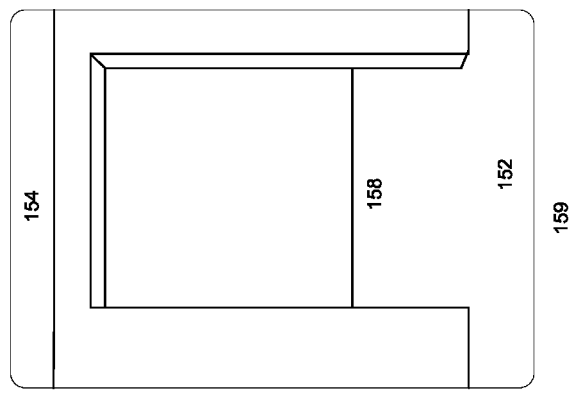
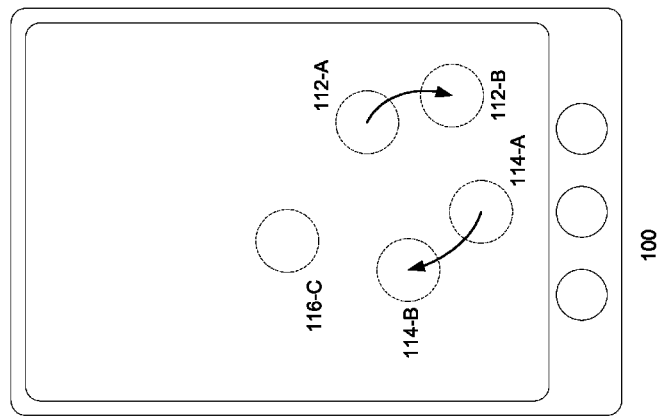
FIG. 6

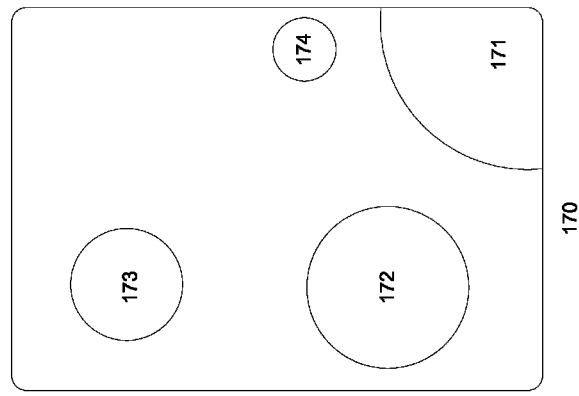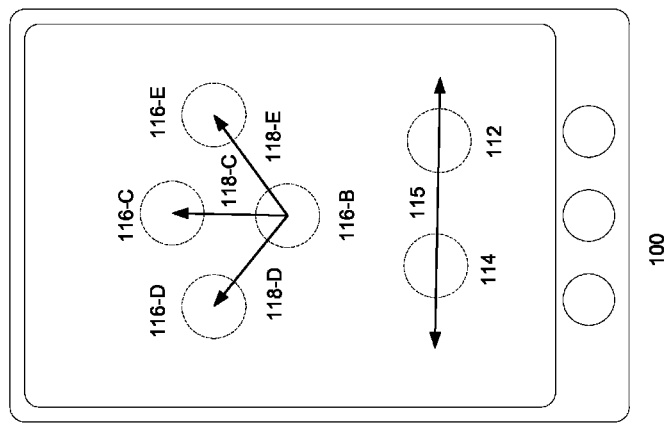
FIG. 7

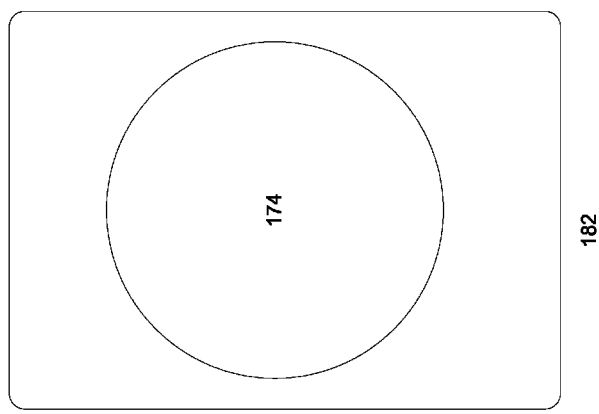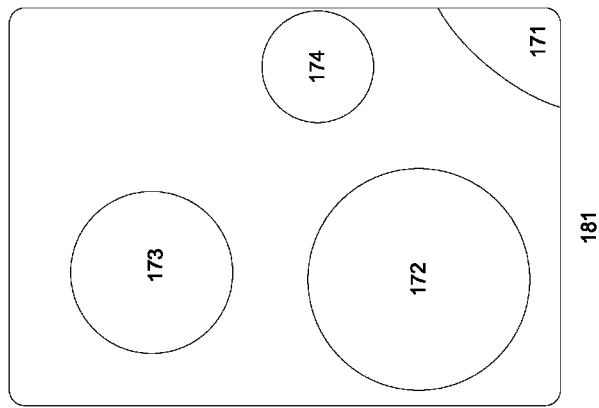
FIG. 8

THREE-DIMENSIONAL NAVIGATION USING A TWO-DIMENSIONAL SURFACE

BACKGROUND

The processing capabilities and prevalence of portable computing devices including, for example, smartphones, tablet computers, gaming and/or music devices, etc., have increased dramatically over the past few years. One area that has seen particular improvement is the display of three-dimensional (3D) objects and environments, which may be displayed, for example on 3D enabled screens, e.g. using polarized images and glasses, or simulated on two-dimensional (2D) screens, e.g. using appropriate perspective, shading, relative object movement, etc.

Many portable devices have limited means of providing user input, such as a minimal number of buttons for basic functions like volume, power, and opening and/or closing applications. Instead, it has become prevalent for such devices to rely on touch screen inputs for more involved commands, such as selecting icons, navigating screens, documents and the like, e.g. by swiping, manipulating documents, e.g. by holding finger press, pinching, and/or de-pinching, etc. However, known touchscreen inputs have limitations in the context of navigating 3D objects and environments.

BRIEF DESCRIPTION OF THE DRAWINGS

Various embodiments in accordance with the present disclosure will be described with reference to the drawings, in which:

FIG. 1 illustrates a touchscreen device and an associated display showing a 3D object, according to at least one example;

FIG. 2 illustrates a touchscreen device and another associated display showing a 3D object being manipulated, according to at least one other example;

FIG. 3 illustrates a touchscreen device and another associated display including a 3D object being manipulated, according to at least one other example;

FIG. 5 illustrates a touchscreen device and another associated display showing a 3D environment, according to at least one other example;

FIG. 6 illustrates a touchscreen device and another associated display showing further navigation of the 3D environment from FIG. 5, according to at least one other example;

FIG. 7 illustrates a touchscreen device and another associated display showing another 3D environment with multiple 3D objects, according to at least one other example;

FIG. 8 illustrates displays showing further navigation of the 3D environment from FIG. 7, according to at least one other example;

DETAILED DESCRIPTION

Figure 4:
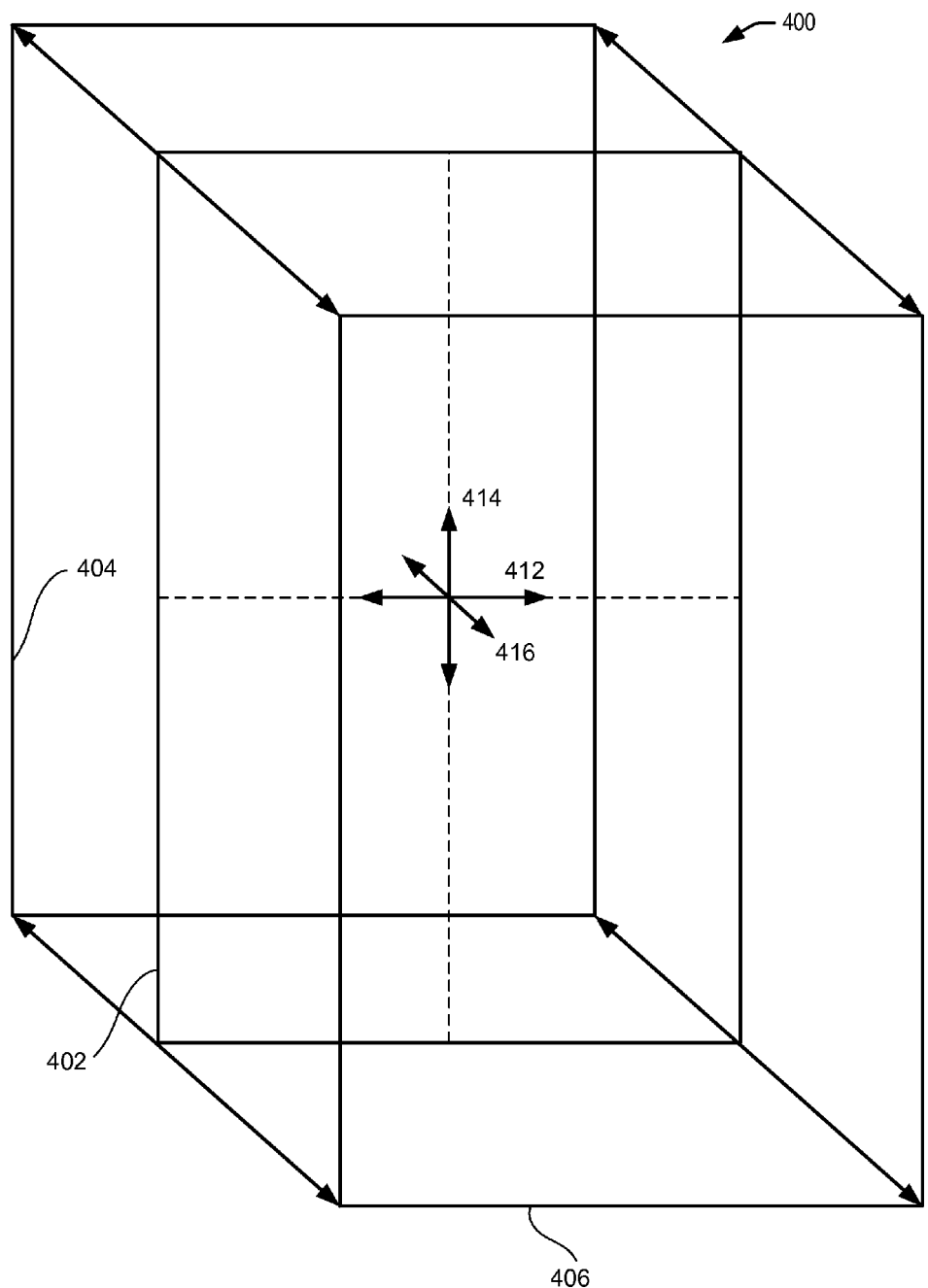
FIG. 4 illustrates a 3D space in which 3D objects may be manipulated and/or navigated, according to at least one example.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, techniques for manipulating 3D representations of 2D objects and/or navigating virtual 3D environments using a 2D interface, such as a touchscreen or touch surface. In some examples, systems may be configured to recognize a multi-touch gesture including a pair of touch points and a third touch point on a 2D surface and to interpret movement of the third touch point as a command to rotate a 3D representation about an axis and/or to change the location of a displayed object and/or a reference/view point relative to the Z axis. Multiple input modes, with different commands, may also be implemented. For example, a 2D navigation mode, that may be limited to moving objects and/or a reference point relative to the X axis and the Y axis and/or rotating objects in a plane parallel to the touch surface, whereas one or more 3D navigation modes may allow for moving objects and/or a reference point relative to X, Y and/or Z axis and/or rotating objects in a plane that is non-parallel to the touch surface. As used herein, a "3D object" is a three-dimensional representation of a two-dimensional image capable of being provided (e.g., displayed, rendered, etc.) on a display screen of a computing device. However, in some examples, the 3D navigation mode may also be utilized to manipulate or otherwise control a physical 3D object (e.g., via remote control) or other 3D representations utilizing a third dimension in physical space such as, but not limited to, a 3D projection or holographic image.

In some examples, a device may display a 3D representation of an object on a display screen (e.g., a touchscreen or the like) of the device. The user may place two fingers on the touchscreen, and use a third finger to indicate that they wish to manipulate the object in a 3D fashion. Once the device identifies that the user is intending to manipulate the object in this way, a 3D navigational mode may be triggered. The user may use the third finger to trigger the 3D navigational mode in various ways, such as placing it in proximity to the two fingers, double tapping the screen, making another predetermined gesture, etc. Once triggered, the 3D navigational mode may be utilized by the user to interact with the 3D representation. For example, a 3D representation of a map (e.g., the globe) may be displayed. Once the 3D navigational mode is triggered, the user may use three different finger inputs to zoom-in, zoom-out, rotate, and/or otherwise navigate the representation of the globe.

According to certain aspects of the present subject matter, a computer-implemented method may include one or more operations of configuring a processor to receive user inputs in a first input mode via a touchscreen of a user device, the first mode including a plurality of 2D navigation commands, displaying a 3D object on the device, and detecting a pair of simultaneous touch points on the touchscreen. A third touch point, that is distinct from the pair of touch points, may also be detected on the touchscreen. In some examples, the first input mode may be changed to a second input mode, the second input mode including 3D navigation commands.

As used herein, a 2D navigation mode may be understood as an input mode that allows moving objects and/or a reference point relative to the X axis and the Y axis and/or rotating objects in a plane parallel to the touch surface, whereas a 3D navigation mode may further allow for moving objects and/or a reference point relative to the Z axis and/or rotating objects in a plane that is non-parallel to the touch surface. However, it should be understood that some examples may not require the method or systems to switch input modes and may be configured, for example, to recognize 2D navigation commands and 3D navigation commands in a single mode.

As used herein, the X and Y axes are perpendicular to one another and define a plane that is parallel to the touch surface and/or display, and the Z axis is perpendicular to a plane that is parallel to the touch surface and/or display.

As used herein, a 3D object should be broadly understood as including display objects (e.g., a three-dimensional representation of a 2D object) and/or environments that can be manipulated or navigated in three dimensions, that have 3D volume, and/or that change appearance based on the movement of a viewpoint in three dimensions (other than mere zoom-in/zoom-out appearance changes). For example, a solid object, such as a sphere, may be understood as a 3D object that has a volume and that can be manipulated in three dimensions (even if it appears the same from different viewpoints), whereas a 2D sheet, or a line or ray, may also be considered to be a 3D object if presented in 3D space that allows movement of a viewpoint around the object, and/or if a change in the appearance of the object is apparent when viewed from different locations in 3D space.

In some examples, a method may including changing the first input mode and/or the second input mode to a third input mode, the third input mode including 3D navigation commands and recognizing at least one input or command not included in the second mode.

In some examples, an input corresponding to at least one of the 3D navigation commands may be detected, e.g. while in the second mode and/or the third mode. In some example, a display of a 3D object may be altered based on the input. For example, a 3D object may be rotated, the X, Y and/or Z coordinates of a 3D object may be changed, and/or a view of a 3D object may be altered based on changes to the X, Y and or Z coordinates of a reference point that the display is based on.

In some examples, altering the 3D object in the second mode may include rotating a displayed object about an axis parallel to the touch screen, and/or altering the 3D object in the third mode may include changing a Z-axis location of a displayed object.

In some examples switching to the second mode and/or the third mode may be based on detecting a touch point, such as the third touch point, or an additional touch point, and/or may be based on a predetermined gesture, multi-touch input, multi-click input, etc.

In some examples, an input for a 3D command may include, for example, movement of a third, or other, touch point while a pair of touch points are substantially static, or substantially simultaneous movement of the pair of touch points and the third, or other touch point. In some examples a 3D command may include axis information that defines an axis for rotation of a displayed object, movement of a displayed object, rotation of a reference point, and/or movement of a reference point.

For example, in the cases of rotation of a displayed object or a reference point, the axis may be an axis in a plane parallel to, or in, the plane of the touchscreen, and may extent in a direction based on the movement direction of the, for an axis defined by the pair of touch points In some examples, the 3D command input may include movement of a third or other touch point while a pair of touch points are substantially static, and the displayed object may be rotated about an axis parallel to the touch screen and/or substantially perpendicular to the third, or other touch point movement direction. In some examples, a displayed object may be rotated about an axis defined by a pair of touch points based on movement of a third, or other touch point.

In some examples, the 3D command input may include substantially simultaneous movement of a pair of touch points and a third, or other, touch point, and a displayed object may be rotated based on the movement of the pair of touch points and the movement of the third, or other, touch point. For example, the displayed object may be rotated based on the combination of rotation input on two separate axes, e.g. simultaneous pitch and yaw.

In some examples, altering a 3D object in a third mode may include changing a Z-axis location of a displayed object based on movement of a third, or other, touch point. In some examples, altering a 3D object in the third mode may further include changing at least one of an X-axis location of the displayed object and a Y-axis location of the displayed object based on the movement of the third, or other, touch point.

According to further examples, an exemplary system may include a memory that stores computer-executable instructions, and a processor configured to access the memory and execute the computer-executable instructions to collectively perform methods such as those described above, and further below.

In some examples, a system may be configured to display a 3D object on a user device; receive user inputs via a touch screen of the user device; detect a pair of simultaneous touch points on the touch screen; detect a third, or other, touch point; recognize a 3D navigation command based on an input including the pair of touch points and the third, or other, touch point; and/or alter the display of the 3D object based on the 3D navigation command.

In some examples, altering the display of the 3D object may include rotating a displayed object about an axis parallel to the touch screen based on movement of the third, or other, touch point, and/or changing a Z-axis location of a displayed object based on movement of the third, or other, touch point.

In some examples, a system may include instructions for changing from a first input mode to a second input mode based on, for example, detecting a touch point, such as the third touch point, or an additional touch point, and/or may be based on a predetermined gesture, multi-touch input, multi-click input, etc. In some examples, a second input mode may include 3D navigation commands and recognize at least one input or command not included in a first input mode.

In some examples, a system may include instructions for changing a first input mode and/or a second input mode to a third input mode, the third input mode including 3D navigation commands and recognizing at least one input or command not included in the first input mode and/or the second input mode.

In some examples, a system may be configured such that altering the 3D object in a second mode includes rotating a displayed object about an axis parallel to the touch screen, and altering the 3D object in a third mode includes changing a Z-axis location of a displayed object.

In some examples, a system may be configured such a 3D command input includes movement of a third, or other, touch point, and a displayed object may be rotated based on the movement of the third, or other, touch point about an axis parallel to the touch screen and substantially perpendicular to the third, or other, touch point movement direction.

In some examples, a system may be configured such that a 3D command input includes movement of a third, or other, touch point, and a displayed object may be rotated based on the movement of the third, or other, touch point about an axis defined by a pair of touch points.

In some examples, a system may be configured such that altering a 3D object includes changing a Z-axis location of a displayed object based on movement of a third, or other, touch point. In some examples, a system may be configured such that altering a 3D object further includes changing at least one of an X-axis location of the displayed object and a Y-axis location of the displayed object based on the movement of the third, or other, touch point.

In some examples, a system may include instructions for ignoring certain movements of the pair of touch points during movement of the third, or other, touch point and/or instructions for ignoring certain movements of the third, or other, touch point during movement of the pair of touch points.

In some examples, a system may be configured to rotate a displayed object in a plane parallel to the touch screen based on movement of a pair of touch points, and to change a Z-axis location of a displayed object based on movement of the third, or other, touch point, while detecting the third touch point.

In some examples, a system may be configured via computer-executable instructions to perform one or more of displaying a 3D object on a device; detecting a pair of simultaneous touch points on a touch screen of the device; detecting a third touch point on the touch screen of the device; changing the first input mode to a second input mode based on detecting the third touch point, the second input mode including 3D navigation commands; changing at least one of the first input mode and the second input mode to a third input mode, the third input mode including 3D navigation commands and recognizing at least one input or command not included in the second mode.

In some examples, a system may be configured to detect an input corresponding to a 3D navigation command included in the second mode and/or the third mode. In some examples, the display of a 3D object may be altered based on the input in the second mode and/or the third mode.

In some examples, a non-transitory computer-readable storage medium may be provided including computer-executable instructions that, when executed by one or more computer systems, configure the one or more computer systems to perform methods such as those discussed above and further below. For example, computer-readable storage medium may be provided with computer-executable instructions that configure one or more computer systems to display a 3D object on a user device; receive user inputs via a touch screen of the user device; detect a pair of simultaneous touch points on the touch screen; detect a third touch point; recognize a 3D navigation command based on an input including the pair of touch points and the third touch point; and/or alter the display of the 3D object based on the 3D navigation command.

In some examples, computer-executable instructions may be provided for altering the display of a 3D object including rotating a displayed object about an axis parallel to the touch screen based on movement of a third, or other touch point, and/or changing a Z-axis location of a displayed object based on movement of a third, or other, touch point.

In some examples, altering the display of a 3D object may include rotating a displayed object based on, for example, movement of a third, or other, touch point, and the displayed object may be selectable by a user from among a plurality of displayed objects. Such selection may be performed, for example, by clicking on the object with a third or other, touch point.

The techniques described above and below may be implemented in a number of ways and in a number of contexts. Several example implementations and contexts are provided with reference to the following figures, as described below in more detail. However, the following implementations and contexts are but a few of many.

FIG. 1 illustrates a computing device 100 and close up of the display 120 of the device 100, according to at least one example. As shown in FIG. 1, device 100 may include a touchscreen 102, on which various touch points and gestures may be detected. Device 100 may represent, for example, a smartphone, a tablet computer, a gaming and/or music device, etc. In the example shown in FIG. 1, a pair of touch points 112, 114 are detected, e.g. based on user finger presses in those locations. A third touch point 116-A is also detected. In some examples, the device 100 may be configured to distinguish between a pair of touch points and a third, or other, touch point based on, for example, the timing of detecting each touch point, the relative locations of the touch points, movement of the touch points, etc. In one example, the system may designate two touch points that are detected at approximately the same time (e.g. within less than 1.0 seconds of each other, less than 0.5 second of each other, or other suitable time) as a pair of touch points, and interpret movement of one or more of those touch points as a "gesture," e.g. a pinch to zoom out, a de-pinch to zoom in, a rotation to perform a 2D rotation of an image displayed on the touch screen, etc.

A third, or other, touch point may be determined based on similar criteria. For example, touch point 116-A may be determined to be a third touch point based on a time delay between detecting touch point pair 112, 114 and touch point 116-A, or the sequence of detecting touch points 112, 114 and 116-A. In some examples, a third, or other, touch point may be distinguished from a select command, e.g. based on a length of time that the touch is detected exceeding a threshold, etc.

After detecting touch point 116-A, the device 100 detects a change in the position of touch point 116-A to touch point 116-B in direction 118. Although direction 118 is shown as a straight line, in some examples systems and methods may recognize gestures including curved and/or multi-direction lines from an initial point to a subsequent point such as 116-A and 116-B.

In the example shown in FIG. 1, the movement of touch point 116-A to 116-B may be interpreted as a 3D command. This may be recognized in a single input mode (e.g. if any third touch point gesture is interpreted as a 3D command), or may be recognized after switching from a first input mode (e.g. recognizing 2D command inputs) to a second input mode (e.g. recognizing one or more 3D command inputs). In examples that involve an input mode switch, this can be done using various techniques. For example, after detecting a pair of touch points, e.g. 112, 114, the device 100 may switch to a 3D mode based on detecting the third touch point 116-A, or may switch to a 3D mode when movement of touch point 116-A is detected. In other examples, the device 100 may be configured to switch to a 3D mode if the third, or other, touch point is detected over a display object that can be manipulated or navigated in 3D.

An example of a displayed object on display 120 is also shown in FIG. 1. It is noted that, in FIG. 1, and various other figures, the display (in this case 120) is shown separately from the touch screen (in this case 102), even though they may represent the same physical component, for ease of depicting the display objects on the touchscreen compared to the various touch points and gestures on the touchscreen. However, in some examples, the display 120 may actually be separate from the touch surface, e.g. when using a touch pad on a laptop computer, or any other touch pad connected to a computer, or other device, with a display.

Display 120 is shown with a displayed object 122, which may represent a solid-body sphere, or any other 3D object as discussed herein. In the example shown in FIG. 1, the device 100 defines a rotational axis 124 through a center of the display object 122 based on touch points 112, 114, e.g. based on the line 115 connecting the centers of touch points 112, 114. However, other means of setting the axis 124 are also possible, some of which are discussed further below. In one such example, the axis 124 may be set to be parallel to the touchscreen and perpendicular to the vector 118. This allows the user to easily rotate the object 122 in various directions simply by moving the third touch point 116-A in different directions.

Various means of determining the center of a 3D object, such as object 122, are known, and are not discussed in further detail than necessary. In some examples, the rotational axis may be set, or adjusted, to another position that does not necessarily pass through the center of the 3D object. For example, an axis may be set that does not pass through the 3D object, and the 3D object may be rotated in an orbit about the axis.

In the example shown in FIG. 1, the axis 124 is in a plane that is parallel (but not necessarily coplanar) to a plane of the touchscreen 102. This can be significant, for example, when the object 122 is positioned in a three dimensional space that may extend below or above the touch screen in the Z axis. That is, as discussed further below with reference to FIG. 4, a three dimensional space with depth may include objects that are positioned at a depth "in" (or, in the case of 3D displays, "out" of) the screen. Therefore, in order to rotate such objects about a rotational axis that passes through the object, the rotational axis is positioned in a plane that is below or above the touchscreen in the Z direction. However, as mentioned above, in some examples, the rotational axis may be set so as not to pass through the object, and may result, for example, in a rotational axis that the object orbits around. As used herein, coplanar planes are also considered to be planes that are parallel to one another.

Returning to the movement of touch point 116-A to touch point 116-B, the device 100 may be configured to recognize that gesture as a 3D command that causes the display object 122 to rotate in the direction 126. For example, in circumstances where the axis 124 is set based on the touch points 112, 114, the device 100 may determine a component of vector 118 that is perpendicular to line 115, and interpret that component as a rotational quantity to be applied to object 122 about axis 124.

FIG. 2 shows further details regarding how a different gesture may cause an opposite rotation of object 122. In this case, the axis 124 is still based on touch points 112, 114 and line 115. However, movement of touch point 116-B to touch point 116-C results in object 122 being rotated in direction 128 (opposite to 126 shown in FIG. 1). The counter rotation shown in FIG. 2 may be considered to be a separate 3D command from the rotation shown in FIG. 1.

In some examples, the user may rotate an object in a 2D mode while maintaining contact with the third touch point, and/or change the axis of rotation of the display object and/or reference point. One way of doing this is shown in FIG. 3.

As shown in FIG. 3, the rotational axis of object 122 may be altered by rotating the touch points 112-A and 114-A to 112-B and 114-B, respectively. In this case, axis 144 is rotated to be parallel with a line extending through the centers of 112-B and 114-B. After the axis 144 is moved, or during movement of the axis, the object 122 may be rotated in direction 142, e.g. by moving a third, or other, touch point.

However, according to some examples, minor, inadvertent movement of the third contact point, such as contact point 116-C, may be disregarded while moving a pair of touch points. For example, one may expect for touch point 116-C to move somewhat when touch points 112-A and 114-A are rotated to 112-B and 114-B due to all of the touch points being established by fingers of the same hand, and the natural tendency for the fingers to move together. Therefore, algorithms may be used that disregard certain movements of touch points, such as 116-C to 116-D. Such algorithms may use factors such as a ratio of the movement of the third touch point compared to the movement of the pair of touch points, a direction of the movement of the third touch point compared to the direction of the movement of the pair of touch points, movement speed, etc. Similar algorithms may also be applied in other situations when a pair of touch moves while detecting a third, or other, touch point, e.g. pinching, de-pinching, etc. Similarly, certain movement of the pair of touch points may be disregarded when a movement of another touch point suggests that the movement of the pair of touch points was inadvertent, e.g. when the pair of touch points expands slightly while moving a third touch point away from the pair, when a touch point moves slightly while another touch point is moved towards it, etc.

In the example shown in FIG. 3, the device 100 may disregard the movement of touch point 116-C to 116-D by comparing the movement vectors of the touch points, determining that the touch points appear to rotate together (e.g. using fuzzy logic), comparing the distances that the touch points move, and concluding that the shorter distance moved by touch point 116-C is consistent with an unintended movement caused by the rotation of touch points 112-A and 114-A.

As mentioned above, various 3D objects described herein may be positioned, manipulated and/or navigated in virtual 3D space that extends above and below the touchscreen in the Z axis. FIG. 4 shows an example of such a 3D space 400 including a plane 402 representing the plane including the touchscreen, and including X axis 412 and Y axis 414. The 3D space 400 extends above the plane 402 along the Z axis 416 toward upper plane 406. In some examples, 3D space above the touchscreen may be presented using a 3D display, hologram, etc. The 3D space 400 extends below the plane 402 along the Z axis 416 toward lower plane 404. In some examples, 3D space below the touchscreen may also be presented using a 3D display. However, 3D space below the touchscreen may also be simulated on 2D displays using size and perspective techniques known in the art.

FIG. 5 shows an example whereby a 2D control surface can be used to navigate in a 3D environment such as shown in FIG. 4. Device 100 is again used to show various touch points 112, 114, 116-A and 116-B. In this instance, the device 100 displays a 3D environment on display 150. The 3D environment depicts a hallway including a floor 152, a ceiling 154, doors 156, 157 and an adjoining room 158. A viewpoint (or reference point) is located at a depth approximately equal to the touchscreen of the device 100. By manipulating the touchscreen of the device 100, the user may navigate the 3D environment shown in the display 150. For example, moving the touch point 116-A to 116-B may cause the viewpoint to advance in the Z direction, i.e. toward door 156. This may be interpreted, for example, by the line 115 being set as a baseline (e.g. representing the X-Y plane) from which the vector 118 is measured. In this instance, the vector 118 is approximately perpendicular to the line 115, so the value of vector 118 is substantially in the Z direction. A movement from touch point 116-B to 116-A could be interpreted as "backing up" or moving away from door 156.

In some examples, or different input modes, the direction of vector 118 may be measured from another baseline, e.g. from a baseline 502 extending horizontally across the screen and through the origination point of a third touch point, such as touch point 116-A. In this case, the direction of vector 118 may be interpreted as advancing the viewpoint in screen 150 toward the door 157. In some examples, the user can switch between different modes, e.g. by double tapping the screen, by tapping the screen in a designated area, etc. In some examples, the device 100 and/or certain applications running on the device or at a remote server may automatically switch modes based on predetermined criteria, e.g. a change in the environment shown on the screen, selection of a 3D object, phases of a game, etc.

It should be noted that, as the user changes the view point, e.g. by advancing toward door 156, door 157, etc., the display of certain objects will change, e.g. the perspective views of doors and/or walls. In some examples, the user may exit a 3D input mode, and use a third, or other, touch point for other purposes such as selecting objects within the 3D environment, etc.

By way of further example, the inputs shown in FIG. 5 may also be interpreted in a way that rotates a viewpoint. For example, by entering an appropriate mode, the movement of touch point 116-A may be interpreted as a view point rotate command, e.g. swiping up rotates the viewpoint up toward the ceiling 154, swiping right rotates the viewpoint toward adjoining room 158, etc. Other means and modes of 3D viewpoint navigation are also possible.

FIG. 6 shows further details regarding a 3D navigation technique as applied to the environment shown in FIG. 5. In FIG. 6, movement of touch points 112-A and 114-A is detected, while third touch point 116-C is being detected. Specifically, touch points 112-A and 114-A rotate to touch points 112-B and 114-B, respectively. In a 3D navigation mode, such movement may be interpreted as a rotate command that rotates the view point, in this case clockwise. The result of this command is shown on screen 159, where the view point has been rotated in the direction of adjoining room 158. By remaining in a particular 3D mode, the user can now immediately enter room 158, e.g. by moving third touch point 116-C up on the touch pad, as described previously.

FIG. 7 shows further details regarding a 3D navigation technique as applied to another 3D environment. In the example shown in FIG. 7, the screen 170 includes a number of 3D objects 171-173. In this example, the objects 171-174 share a common shape and size. However, they are located at different depths in the Z direction, and, therefore are presented in different sizes to simulate 3D depth. The user can use the 2D controls on device 100 to navigate within the environment shown on the screen 170, and to select and manipulate objects 171-174.

For example, as discussed previously, the device 100 may enter a 3D navigation mode based on the detection of the pair of touch points 112, 114 and another touch point 116-B. Directional movement of the viewpoint within the 3D environment may be input by moving touch point 116-B in any direction. In one example, movement to touch point 116-C, and vector 118-C, may be interpreted as a command to advance directly into screen 170 (i.e. in line with the Z axis). When doing so, the screen 170 may be changed to reflect the view point's change in location, such as shown on screen 181 in FIG. 8, where the objects 171-174 have been presented "closer" to the viewpoint.

In another example, or mode, the vector 118-C may be interpreted as a view point rotate command, i.e. rotate the viewpoint of display 170 up. Similarly, movement to touch point 116-D, and vector 118-D, may be interpreted as a command to advance into screen 170 toward the left of the screen (i.e. along a vector with a Z and X component). In another example, or mode, the vector 118-D may be interpreted as a view point rotate command, i.e. rotate the viewpoint of display 170 up and left. Likewise, movement to touch point 116-E, and vector 118-E, may be interpreted as a command to advance into screen 170 toward the right of the screen (i.e. along a vector with a Z and X component). In another example, or mode, the vector 118-E may be interpreted as a view point rotate command, i.e. rotate the viewpoint of display 170 up and right. Similar interpretations may be applied to any movement of touch point 116-B. Additionally, certain examples, or modes, may allow for changing a reference axis or rotational axis, via adjustment of line 115, as discussed previously.

In some examples, if a touch point is detected in the same position as a displayed object (e.g. objects 171-174), then the touch point may be interpreted as an object select command. In some examples, this may further be used to switch between input modes, e.g. between a 2D and 3D mode, and/or between different 3D modes. For example, the device 100 may be in a 2D input mode that allows the user to move the display 170 in two dimensions by swiping a single touch point. If the user selects an object, e.g. 174, then the device may switch to a 3D mode that allows the user to manipulate the object, e.g. rotate, etc. The selection of an object, such as object 174, may also be interpreted as a view point change command that brings the object closer and centered with the viewpoint, as shown in FIG. 8, screen 182. This may be beneficial, for example, in allowing the user to more easily manipulate the selected object and/or navigate around the object. It should be noted that such mode switching does not necessarily require the device to detect a pair of touch points as discussed in other examples.

In some examples, a user may be navigating a 3D environment using a 3D mode such as described with FIGS. 5 and 6. Then, when an object is selected, the device may switch to another 3D mode to manipulate the object, such as described with FIGS. 1-3. As will be appreciated considering the various input and command descriptions provided above, in some examples a similar input may be recognized as a different command in different input modes. For example, a swipe gesture in one mode may correspond to a view point movement command, whereas the same swipe gesture may correspond to an object rotate command in another mode.

Figure 9:
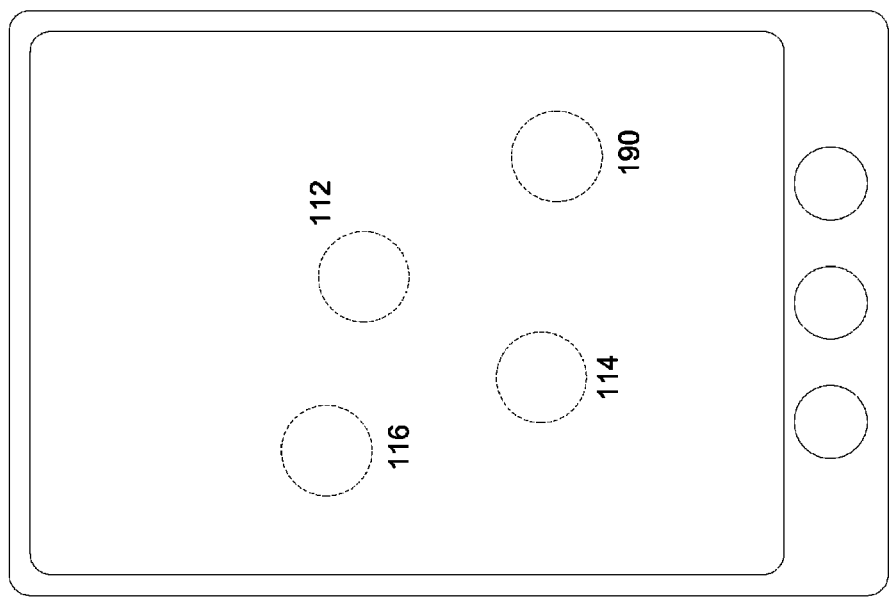
FIG. 9 illustrates a touchscreen device registering multiple touch points, according to at least one other example.

In some examples, input mode switching, object selection, and/or other commands may be based on the detection of another touch point beyond a pair of touch points and/or a third touch point. For example, as shown in FIG. 9, while detecting a pair of touch points 112, 114 and a third touch point 116, another touch point 190 may be detected. In certain modes, the detection of touch point 190 may be interpreted as a mode switch command, e.g. to switch between different 3D input modes, an object select command, or other commands as may be appropriate.

Figure 10:
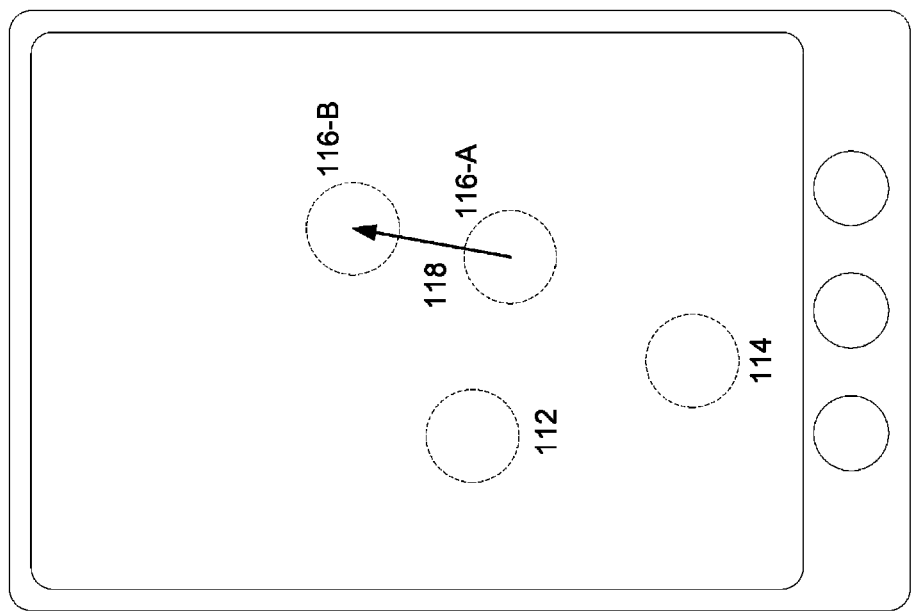
FIG. 10 illustrates a touchscreen device registering multiple touch points in a left-hand configuration, according to at least one other example.

In some examples, algorithms may be employed to more accurately discriminate between touch point pairs, and other touch points, depending on the handedness of the user. For example, a user may select a preferred hand, which allows the system to more easily look for touch point arrangements such as shown in FIG. 10, with touch points 112, 114, 116-A and 116-B positioned by a left-handed user. This can be particularly helpful in situations where three touch points are detected closely in time, and provides an alternative means by which the spatial arrangement of the touch points can be interpreted. In other examples, the system may infer the handedness of the user, e.g. by analyzing the arrangement and/or movement of touch points over time, and adjust the input algorithms accordingly.

Figure 11:
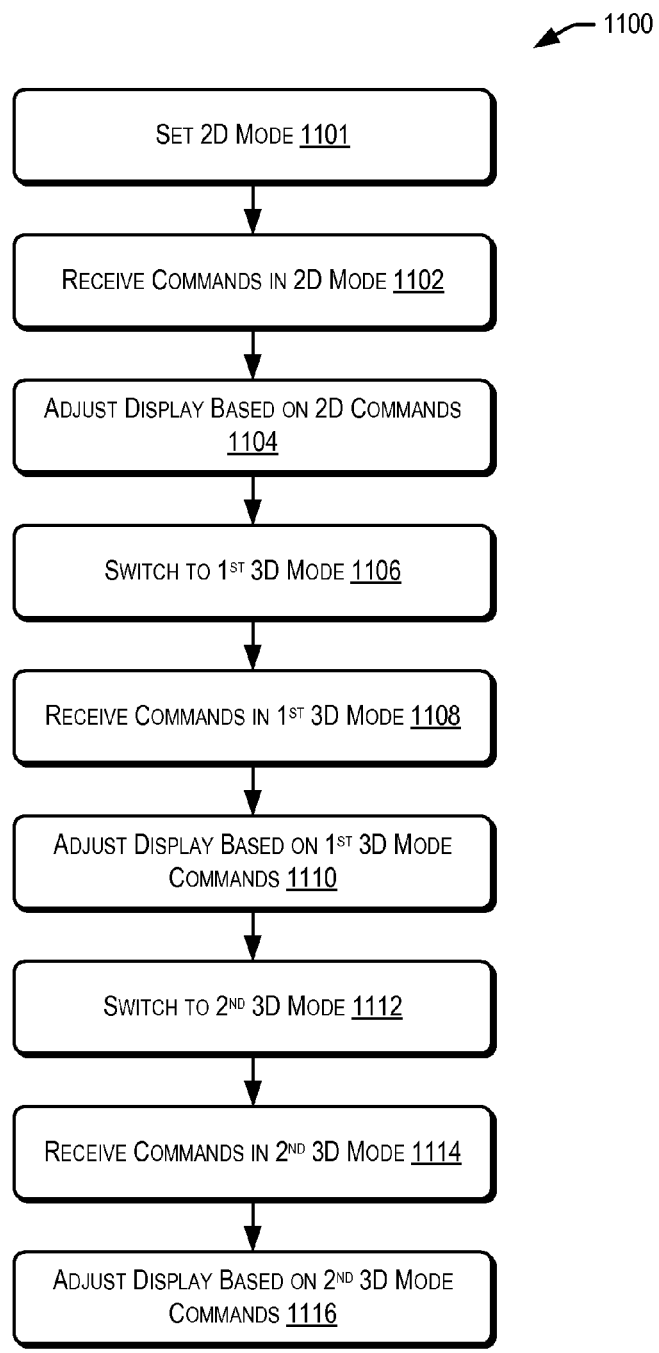
FIG. 11 is a flow diagram depicting an example flow including input mode changes as described herein, according to at least one other example.
Figure 12:
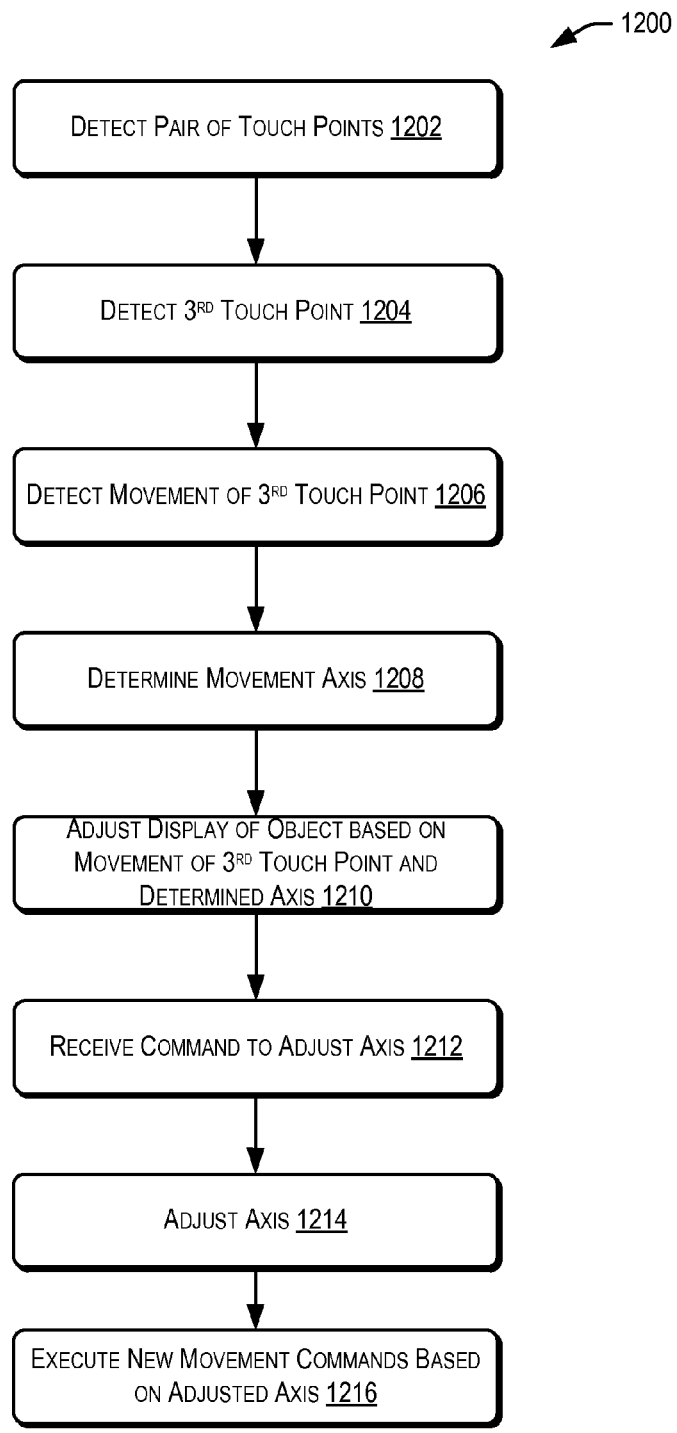
FIG. 12 is a flow diagram depicting an example flow including a 3D navigation technique including changes to an axis as described herein, according to at least one other example.

FIGS. 11-12 illustrate example flow diagrams showing respective processes 1100, and 1200 for implementing 3D navigation processes as described herein. These processes are illustrated as logical flow diagrams, each operation of which may represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures and the like that perform particular functions or implement particular data types. The order in which the operations are described is not intended to be construed as a limitation, and any number of the described operations can be combined in any order and/or in parallel to implement the processes. Additionally, any specific reference to one or more operations being capable of being performed in a different order is not to be understood as suggesting that other operations may not be performed in another order.

Some, any, or all of the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium may be non-transitory.

Some, any, or all of the processes may be performed on a user device, on a server in communication with a user device, or combinations thereof.

FIG. 11 depicts an illustrative flow 1100 in which techniques for 3D navigation may be implemented. In illustrative flow 1100, operations may be performed by one or more processors of one or more user devices, servers, service provider computers, etc., and/or instructions for performing the operations may be stored in one or more memories of the user devices, servers, service provider computers, etc.

In 1101, a control system, e.g. of a user device or an online service provider, may be set to a 2D mode. In the 2D mode, a first set of commands may be recognized that may, for example, traverse a display or displayed objects in two dimensions, such as X and Y coordinates. The 2D mode may also be configured to recognize commands to switch modes to one or more 3D input modes, as discussed herein.

The method may continue with 1102, in which one or more commands recognized by the 2D mode are received. Such commands may be received, for example, locally on a user device with a touchscreen, on a computing device with an associated touchpad, and/or over a network by a remote service provider that is serving content to one or more remote devices.

The method may continue with 1104, in which a display is adjusted based on the received commands from 1102. Such changes may include, for example, traversing a display screen, or other object, or other changes that do not involve 3D manipulation or navigation of an object. The adjustments may be performed, for example, locally on a user device with a display, on a computing device with an associated display, and/or over a network by a remote service provider that is serving content to one or more remote devices with associated displays.

The method may continue with 1106, in which an input mode is switched to a first 3D input mode. Switching to the first 3D mode may be based on, for example, detection of a third, or other, touch point, detection of a double tap using a third, or other, touch point, detection of a predetermined gesture (e.g. a swipe, double swipe, curved swipe, etc.) using a third, or other, touch point, user selection of a 3D object, etc.

Such 3D input modes may include any of the 3D modes described herein, and others that will be appreciated by those of skill in the art considering the contents of the disclosure. In some examples, the first 3D mode may include a second set of various 3D commands (not included in the 2D mode) that allow one or more of manipulating a 3D object and/or navigating a view point in a 3D environment. In some examples, at least one of the 3D commands in the second set of commands may have a similar input to a command in the 2D mode that the system recognizes as a 3D command after switching modes.

The method may continue with 1108, in which one or more commands recognized by the first 3D mode are received. As with the 2D mode, such commands may be received, for example, locally on a user device with a touchscreen, on a computing device with an associated touchpad, and/or over a network by a remote service provider that is serving content to one or more remote devices.

The method may continue with 1110, in which a display is adjusted based on the received commands from 1108. Such changes may include, for example, manipulating a 3D object, navigating a view point in a 3D environment, or other changes that may be similar or the same as changes made in the 2D mode. That is, the 3D mode may include commands that are recognized in the 2D mode, so long as they are distinguishable from the other 3D commands.

As with the 2D mode, the adjustments may be performed, for example, locally on a user device with a display, on a computing device with an associated display, and/or over a network by a remote service provider that is serving content to one or more remote devices with associated displays.

The method may continue with 1112, in which an input mode is switched to a second 3D input mode. Switching to the second 3D mode may be based on, for example, detection of a third, or other, touch point, detection of a double tap using a third, or other, touch point, detection of a predetermined gesture (e.g. a swipe, double swipe, curved swipe, etc.) using a third, or other, touch point, user selection of a 3D object, etc. In some examples, different inputs may be recognized while in the first 3D mode to switch to the second 3D mode or switch back to the 2D mode.

The second 3D input mode may include any of the 3D modes described herein, and others that will be appreciated by those of skill in the art considering the contents of the disclosure. In some examples, the second 3D mode may include a third set of various 3D commands (not included in the 2D mode or the first 3D mode) that allow one or more of manipulating a 3D object and/or navigating a view point in a 3D environment. In some examples, at least one of the 3D commands in the third set of commands may have a similar input to a command in the 2D mode and/or a command in the first 3D mode that the system recognizes as a (different) 3D command after switching modes.

The method may continue with 1114, in which one or more commands recognized by the second 3D mode are received. As with the 2D mode and the first 3D mode, such commands may be received, for example, locally on a user device with a touchscreen, on a computing device with an associated touchpad, and/or over a network by a remote service provider that is serving content to one or more remote devices. In some examples, different inputs may be recognized while in the second 3D mode to switch to the first 3D mode or to the 2D mode.

The method may continue with 1116, in which a display is adjusted based on the received commands from 1114. Such changes may include, for example, manipulating a 3D object, navigating a view point in a 3D environment, or other changes that may be similar or the same as changes made in the 2D mode. That is, the second 3D mode may include commands that are recognized in the 2D mode, so long as they are distinguishable from the other 3D commands.

As with the 2D mode and the first 3D mode, the adjustments may be performed, for example, locally on a user device with a display, on a computing device with an associated display, and/or over a network by a remote service provider that is serving content to one or more remote devices with associated displays.

Additional examples are described with reference to flow 1200 shown in FIG. 12. In illustrative flow 1200, operations may be performed by one or more processors of one or more service provider computers and/or instructions for performing the operations may be stored in one or more memories of the service provider computers.

The flow 1200 may begin at 1202, in which a pair of touch points are detected, e.g. via a touchscreen of a user device, or a touch pad that is in communication with a computing device with an associated display. Such detection may be performed, for example, locally on a user device with a touchscreen, on a computing device with an associated touchpad, and/or by a remote service provider that is serving content to one or more remote devices.

Two touch points may be recognized as a pair of touch points in various ways, such as those described herein, and others that will be appreciate by those of skill in the art considering the contents of the disclosure. For example, the timing and/or arrangement of multiple touch points may be evaluated to determine two of such touch points that qualify as a "pair." Pairs of touch points may be used for various purposes described herein, e.g. performing 2D pinching/depinching commands, setting and/or adjusting a 3D reference axis, etc.

The method may continue with 1204, in which a third touch point is detected. Such detection may be performed, for example, locally on a user device with a touchscreen, on a computing device with an associated touchpad, and/or by a remote service provider that is serving content to one or more remote devices.

A touch point may be recognized as a third touch point in various ways, such as those described herein, and others that will be appreciate by those of skill in the art considering the contents of the disclosure. For example, algorithms may be employed to analyze the timing, arrangement and/or movement of one or more touch points to designate a touch point that is used to obtain 3D movement instructions.

The method may continue with 1206, in which movement of the third touch point is detected. Such detection may be performed, for example, locally on a user device with a touchscreen, on a computing device with an associated touchpad, and/or by a remote service provider that is serving content to one or more remote devices.

In some examples, a vector associated with the movement of the third touch point may be used for further processing. In some examples, a 2D vector may be used to implement 3D navigation, as described further herein.

In some examples, 1206 may further include processes by which movement of the third touch point is disregarded, e.g. if it is below a threshold, if it is detected contemporaneously with a corresponding movement of the pair of touch points, etc.

The method may continue with 1208, in which a movement axis is determined. Such determination may be performed, for example, locally on a user device with a touchscreen, on a computing device with an associated touchpad, and/or by a remote service provider that is serving content to one or more remote devices.

A movement axis may include, for example, a rotational axis for rotating and/or orbiting a 3D object, a rotational axis for rotating and/or orbiting a view point, an axis from which the direction of the vector in 1206 is measured, or other reference lines or planes described herein.

The movement axis may be determined in various ways including those described herein and others that will be appreciate by those of skill in the art considering the contents of the disclosure. For example, the movement axis may be based on the direction of the vector from 1206, based on the pair of touch points from 1202, and/or may be set by an application.

The method may continue with 1210, in which the display of an object is adjusted based on the movement of the third touch point and the determined axis. Such adjustment may include, for example, adjusting display objects based on movement of a reference point and/or adjusting the display of a 3D object that is being manipulated.

In some examples, the display may be adjusted locally on a user device with a touchscreen, on a computing device with an associated display, and/or by a remote service provider that is serving content to one or more remote devices with associated displays.

The method may continue with 1212, in which a command to adjust the axis is received. As with the other commands received in process 1200, such commands may be received, for example, locally on a user device with a touchscreen, on a computing device with an associated touchpad, and/or by a remote service provider that is serving content to one or more remote devices. Commands to adjust the axis may take various forms such as those described herein and others that will be appreciated by those of skill in the art considering the contents of the disclosure. For example, a rotation of a pair of touch points while in a 3D mode and/or while detecting a third touch point may be interpreted as a command to change the movement axis. In other examples, a change in the direction of movement of the third touch point may change the movement axis (e.g. when the axis is based on the direction of the vector in 1206).

The method may continue with 1214, in which the movement axis is adjusted based on the command from 1212. Movement of the axis may take various forms such as those described herein and others that will be appreciated by those of skill in the art considering the contents of the disclosure. In one example, the axis may be moved in substantially real time while the pair of touch points and/or the third touch point are moving. By such methods, a user may be allowed to provide a curving input, e.g. that combines a 3D movement command with an axis movement command.

The method may continue with 1216, in which new 3D movement commands may be executed based on the adjusted axis. As with 1210, such adjustment may include, for example, adjusting display objects based on movement of a reference point and/or adjusting the display of a 3D object that is being manipulated.

Figure 13:
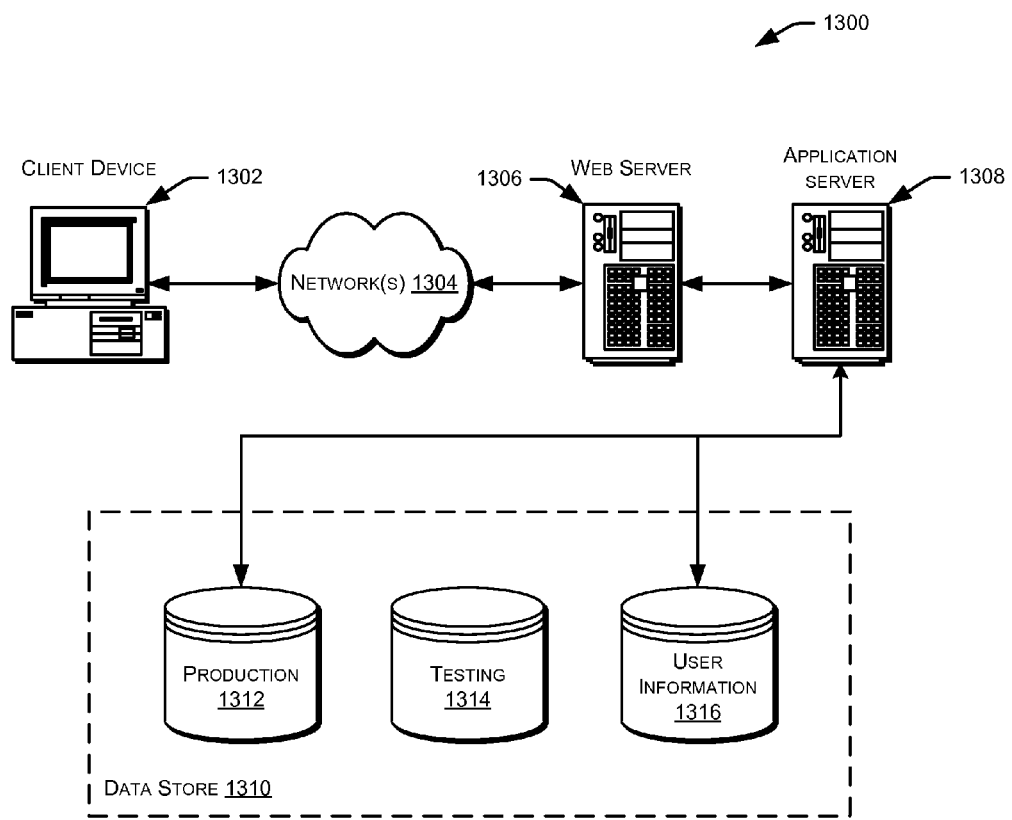
FIG. 13 illustrates an example architecture for implementing 3D navigation in an online environment as described herein, according to at least one other example.

FIG. 13 illustrates aspects of an example environment 1300 for implementing aspects in accordance with various embodiments. As will be appreciated, although a Web-based environment is used for purposes of explanation, different environments may be used, as appropriate, to implement various embodiments. The environment includes an electronic client device 1302, which can include any appropriate device operable to send and receive requests, messages, or information over an appropriate network 1304 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1306 for receiving requests and serving content in response thereto, although for other networks an alternative device serving a similar purpose could be used as would be apparent to one of ordinary skill in the art.

The illustrative environment includes at least one application server 1308 and a data store 1310. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing, and/or retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 1302 and the application server 1308, can be handled by the Web server. It should be understood that the Web and application servers are not required and are merely example components, as structured code discussed herein can be executed on any appropriate device or host machine as discussed elsewhere herein.

The data store 1310 can include several separate data tables, databases or other data storage mechanisms and media for storing data relating to a particular aspect. For example, the data store illustrated includes mechanisms for storing production data 1312 and user information 1316, which can be used to serve content to the client device 1302.

The data store 1310 also is shown to include a mechanism for storing log data 1314, which can be used for reporting, analysis, or other purposes such as those described herein. It should be understood that there can be many other aspects that may need to be stored in the data store, such as for page image information and to access right information, which can be stored in any of the above listed mechanisms as appropriate or in additional mechanisms in the data store 1310. The data store 1310 is operable, through logic associated therewith, to receive instructions from the application server 1308 and obtain, update or otherwise process data in response thereto. In one example, a user might submit a request to access a certain type of item. In this case, the data store might access the user information to verify the identity of the user, and can access the item for the user. The information then can be returned to the user, such as in a game or other content that the user is able to view on the user device 1302.

Each server typically will include an operating system that provides executable program instructions for the general administration and operation of that server, and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 13. Thus, the depiction of the system 1300 in FIG. 13 should be taken as being illustrative in nature, and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen or keypad), and at least one output device (e.g., a display device, printer or speaker). Such a system may also include one or more storage devices, such as disk drives, optical storage devices, and solid-state storage devices such as RAM or ROM, as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, DVD or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
    configuring a processor to receive user inputs in a first input mode via a touch screen of a user device, the first input mode including a plurality of two-dimensional navigation commands;
    displaying a three-dimensional representation of an object on the device;
    detecting a pair of simultaneous touch points on the touch screen;
    detecting a third touch point on the touch screen;
    detecting a fourth touch point on the touch screen while detecting the pair of simultaneous touch points and the third touch point, wherein the fourth touch point is interpreted as at least one of an input mode switch command between different 3D input modes or an object select command;
    changing the first input mode to a second input mode, the second input mode including a first set of three-dimensional navigation commands;
    changing at least one of the first input mode or the second input mode to a third input mode, the third input mode including a second set of three-dimensional navigation commands, the second set of three-dimensional navigation commands including at least one input or command not included in the first set of three-dimensional navigation commands;
    in at least one of the second input mode or the third input mode, detecting an input corresponding to at least one of the three-dimensional navigation commands; and
    in the at least one of the second input mode or the third input mode, altering the display of the three-dimensional representation based at least in part on the input, the altering of the three-dimensional representation in the second input mode including rotating the three-dimensional representation about an axis parallel to the touch screen, and the altering of the three-dimensional representation in the third input mode including changing a Z-axis location of the three-dimensional representation.

2. The computer-implemented method of claim 1, wherein switching to at least one of the second input mode or the input third mode is based at least in part on the detection of the third touch point.

3. The computer-implemented method of claim 1, wherein the input includes at least one of movement of the third touch point while the pair of touch points are substantially static, an axis defined by the pair of touch points, or substantially simultaneous movement of the pair of touch points and the third touch point.

4. The computer-implemented method of claim 3, wherein the input includes movement of the third touch point while the pair of touch points are substantially static, and the three-dimensional representation is rotated about an axis parallel to the touch screen and substantially perpendicular to the third touch point movement direction.

5. The computer-implemented method of claim 3, wherein the input includes movement of the third touch point while the pair of touch points are substantially static, and the three-dimensional representation is rotated about an axis defined by the pair of touch points based at least in part on the movement of the third touch point.

6. The computer-implemented method of claim 3, wherein the input includes substantially simultaneous movement of the pair of touch points and the third touch point, and
    the three-dimensional representation is rotated based at least in part on the movement of the pair of touch points and the movement of the third touch point.

7. The computer-implemented method of claim 1, wherein altering the three-dimensional representation in the third input mode includes changing a Z-axis location of the three-dimensional representation based at least in part on movement of the third touch point.

8. The computer-implemented method of claim 7, wherein altering the three-dimensional representation in the third input mode includes changing at least one of an X-axis location of the three-dimensional representation or a Y-axis location of the three-dimensional representation based at least in part on the movement of the third touch point.

* * * * *